2,964,022
Patented Dec. 13, 1960

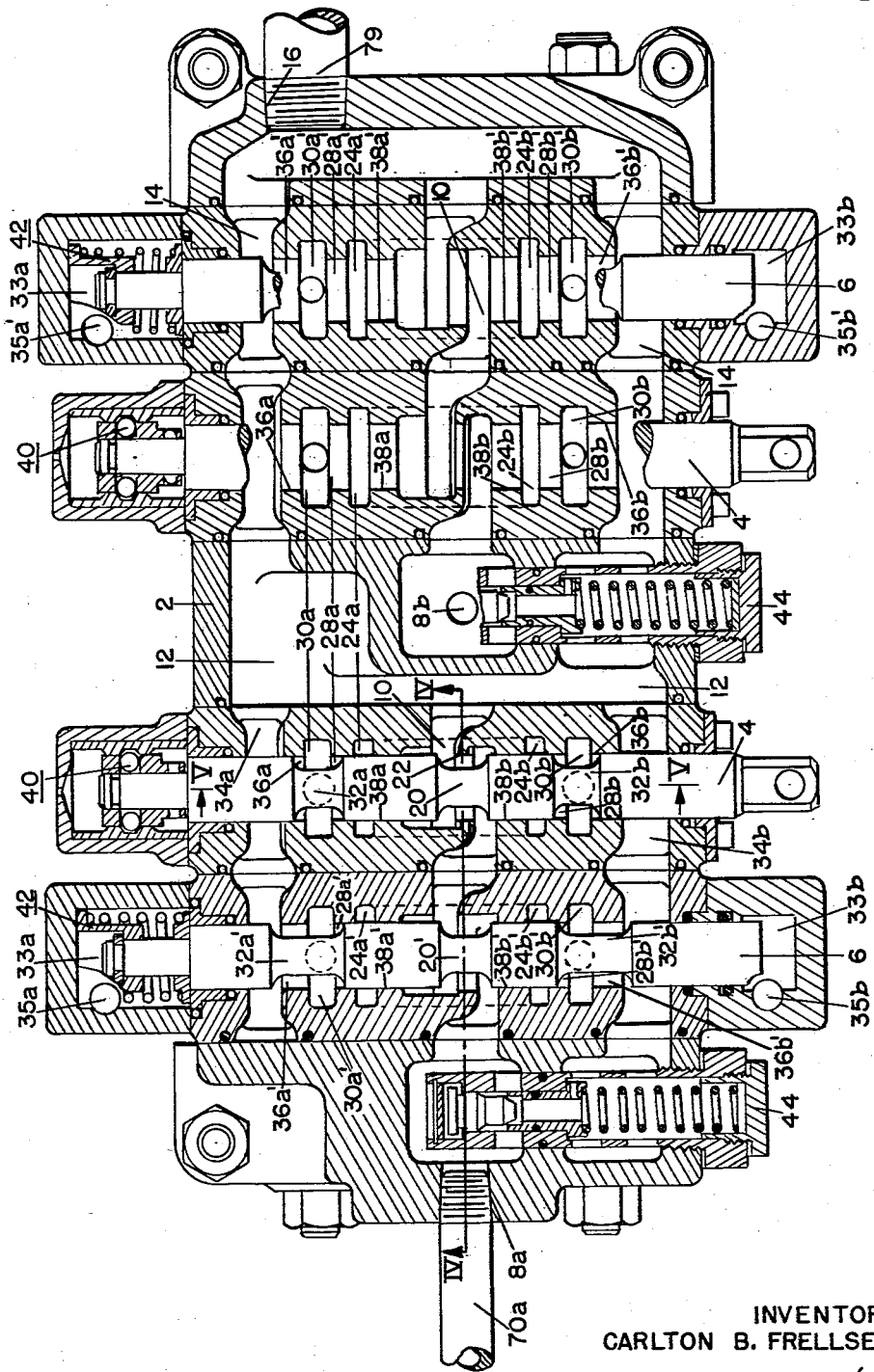
Dec. 13, 1960 — C. B. FRELLSEN — 2,964,022
HYDRAULIC CONTROL AND SYSTEM FOR A MOVABLE VEHICLE
Filed July 11, 1957 — 3 Sheets-Sheet 1
FIG. I.
INVENTOR:
CARLTON B. FRELLSEN
BY *E. Wallace Breisch*
ATTORNEY Dec. 13, 1960  C. B. FRELLSEN  2,964,022
HYDRAULIC CONTROL AND SYSTEM FOR A MOVABLE VEHICLE
Filed July 11, 1957  3 Sheets-Sheet 2
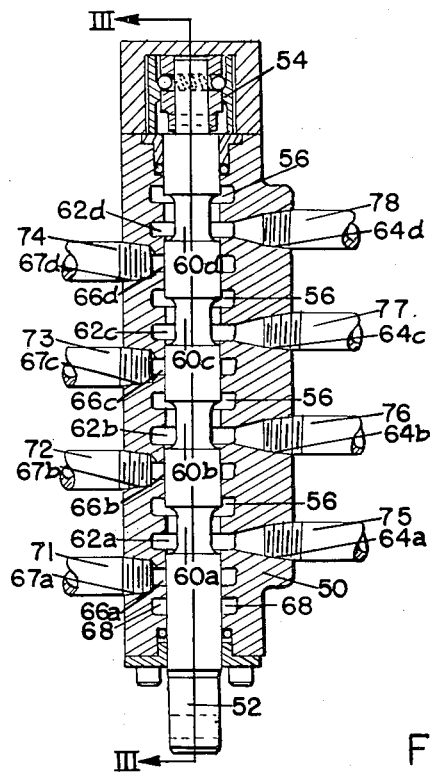
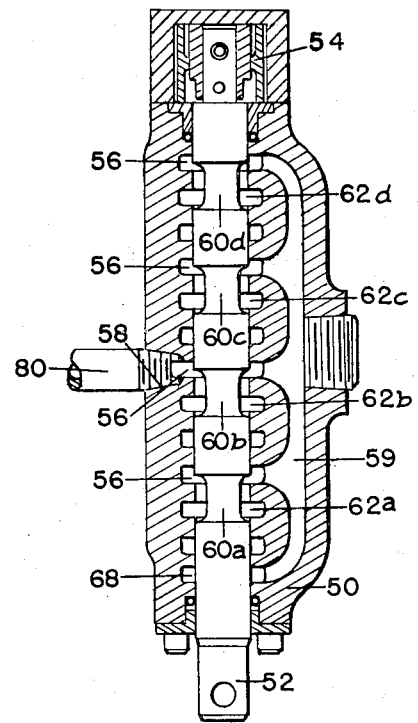
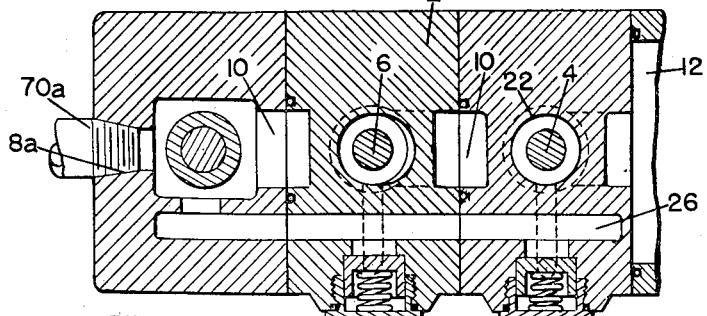
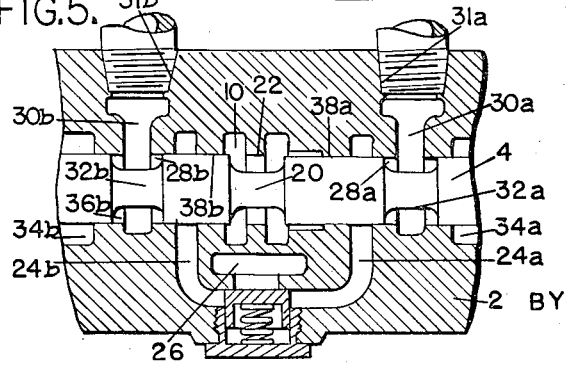
INVENTOR:
CARLTON B. FRELLSEN
ATTORNEY

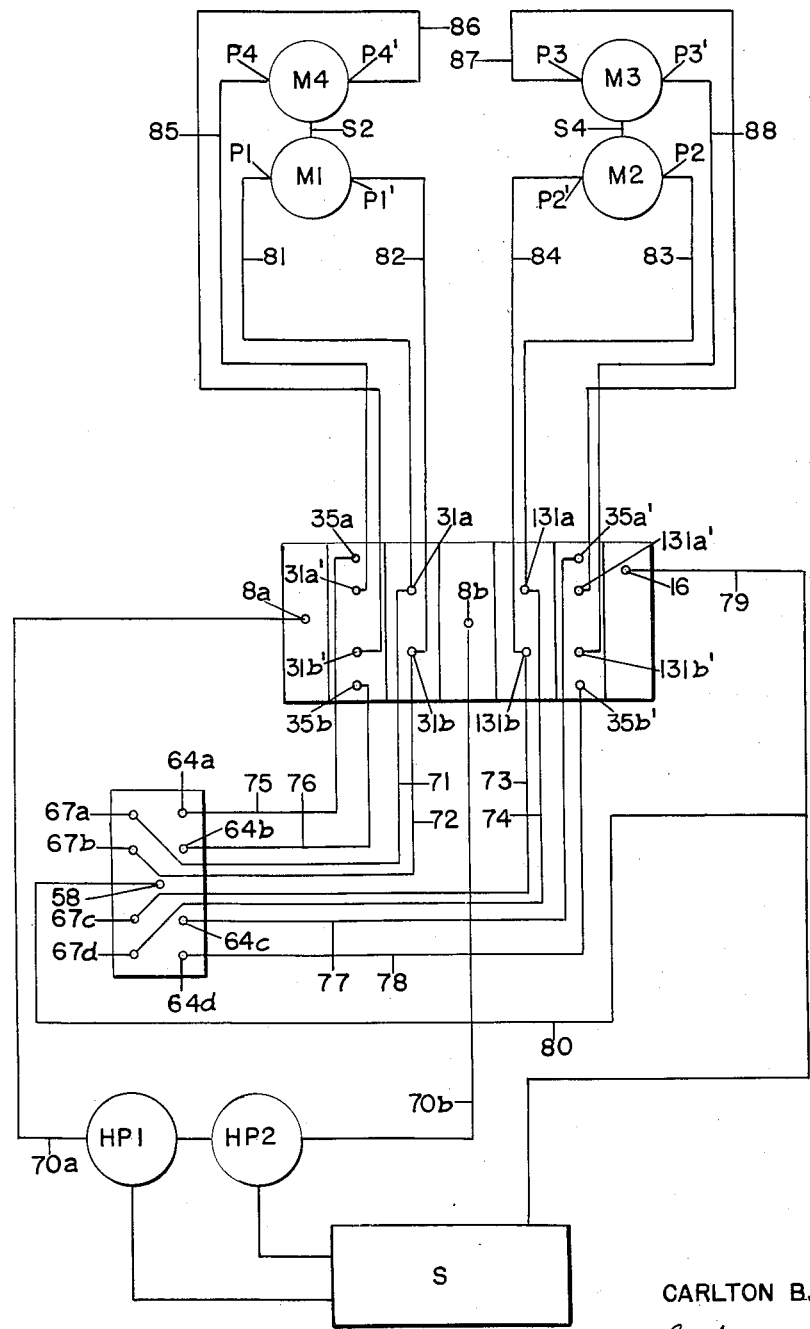

2,964,022

HYDRAULIC CONTROL AND SYSTEM FOR A MOVABLE VEHICLE

Carlton B. Frellsen, Franklin, Pa., assignor to Joy Manufacturing Company, Pittsburgh, Pa., a corporation of Pennsylvania Filed July 11, 1957, Ser. No. 671,281

13 Claims. (Cl. 121—46.5)

My invention relates to hydraulic controls and more particularly to hydraulic devices for controlling the operation of movable endless treads of a movable vehicle.

As is well known many vehicles are provided with a pair of movable endless treads for causing movement of the vehicle. Some of such vehicles, such as mining vehicles, are hydraulically driven by means which are not readily variable so that in general means for obtaining different vehicle speeds require rather extensive and expensive apparatus.

Accordingly one object of my invention is to provide new and improved hydraulic controls for controlling the speed of a vehicle having a pair of endless tread means for obtaining movement thereof.

Another object of my invention is to provide new and improved hydraulic controls having a first movable means for controlling the operation of a second movable means in conjunction with a selector valve.

A more specific object of my invention is to provide new and improved hydraulic controls one of which is movable to drive a driven means and which in conjunction with a selector valve controls the movement of another movable control means which controls still another driven means.

These and other objects of my invention will become more apparent when taken in conjunction with the following detailed description of a preferred embodiment thereof and the following drawings in which:

Figure 1 is a cross sectional view of a control valve constructed in accordance with the principles of my invention having portions thereof removed to more clearly illustrate the construction thereof, Figure 2 is a cross sectional view of a selector valve constructed in accordance with the principles of my invention, Figure 3 is a cross sectional view of the selector valve shown in Figure 2 taken substantially along the line III—III thereof, Figure 4 is a partial cross sectional view of the control valve shown in Figure 1 taken substantially along the line IV—IV thereof, the view being inverted in the drawing, Figure 5 is a partial cross sectional view of the control valve as shown in Figure 1 taken substantially along the line V—V thereof, the view being inverted in the drawing, Figure 6 is a diagrammatic representation of a hydraulic circuit employing hydraulic controls constructed in accordance with the principles of my invention.

Referring to Figures 1,4 and 5, it will be noted that a control valve constructed in accordance with the principles of my invention comprises an elongated housing 2 which is formed as hereinafter described in any suitable manner from any suitable material such as cast iron, as is well known in the art. The control valve comprises a pair of hydraulically identical, partially physically reversed structures which are secured together to provide means for controlling the direction of movement of a pair of auxiliary means from a single location as described hereinafter. As shown each half of a housing 2 is provided with a pair of laterally adjacent, elongated cylindrical spools 4 and 6 which extend laterally through the housing 2 and each of which is provided with longitudinally spaced and elongated circumferentially reduced portions at specific locations as more clearly described hereinafter. One end of each spool 4 extends outwardly of the housing 2 so that such one end may be engaged in any suitable manner, such as manually or by means of operating levers, to obtain reciprocable movement of the spools 4 laterally of the housing 2 from the neutral position shown. The spools 6 are captively located within the housing 2 and as will become apparent herein their movement from the neutral position shown is controlled by the operation of the spools 4.

The housing 2 is provided with a spaced pair of suitable hydraulic fluid inlet ports 8a and 8b each of which is connected to one end of a suitable separate hydraulic passageway 10 extending substantially centrally and longitudinally of the housing 2 in the same direction. Referring to the structure shown in the left half of Figure 1 it will be noted that the left passageway 10 extends inwardly of the housing 2 from inlet port 8a at the left end thereof to a central passageway 12 extending laterally of the housing 2. The passageway 12 has its opposite ends connected to suitable passageways 14 inwardly adjacent the outer sides of the right side of the housing 2 which in turn are connected to a suitable outlet port 16. The other inlet port 8b is connected to the innermost end of the right passageway 10, the outer end of which is also connected to a suitable outlet port 16.

The spools 4 and 6 do not constitute a part of my invention but are only illustrative on one type of movable member which may be employed to obtain the desired hydraulic connections as hereinafter described. Each of the spools 4 and 6 are formed from any suitable material such as stainless steel in a manner as is well known in the art and reciprocate laterally of the housing 2 in order to obtain a reversal of motion of the controlled apparatus. Accordingly, it will be noted that the housing 2 and the spools 4 and 6 are hydraulically identical on each side of the horizontal center line of Figure 1. Each of the spools 4 is provided with a central circumferentially reduced portion 20 which, with the spools 4 in the neutral position, is located approximately centrally of the passageways 10 in order to permit hydraulic fluid to flow therearound. It will be noted that a circular seat 22 is located within each of the passageways 10 which is of a size to closely receive the outer diameter of the spools 4 therein so that the flow of hydraulic fluid through the passageways 10 can be stopped.

Each half of the housing 2 is provided with a hydraulic passageway 24a and 24b laterally adjacent the sides, respectively, of the passageway 10 therein. Each pair of passageways 24a and 24b extend outwardly of the housing 2 and are connected to separate, spaced hydraulic passageways 26. Each of the passageways 26 extends around the spools 4 and 6 in one half of the housing 2 and is connected to the passageway 10 in the same half of the housing 2 adjacent the inlet port 8a (see Figures 4 and 5). The ends of the passageways 24a and 24b not connected to the passageways 26 surround the portions of the spools 4 spaced longitudinally extending outwardly around the reduced portions 20, respectively. Spaced circular hydraulic passageways 28a and 28b extend laterally outwardly of the housing 2 from the end of each pair of passageways 24a and 24b not connected to the passageways 26, respectively, which are of a size to closely receive the outer diameter of the spool 4 therein. Each passageway 28a and 28b of each pair thereof terminates in spaced hydraulic passageways 30a and 30b, respectively, which passageways 30a and 30b extend outwardly around the spool 4 therein and outwardly of the housing 2 and terminate in suitable outlet ports 31a and 31b, respectively.

Each spool 4 is provided with spaced circumferentially reduced portions 32a and 32b which, when the spool 4 is in the neutral position, are aligned with passageways 30a and 30b, respectively. The left side of the housing 2 is also provided with spaced hydraulic passageways 34a and 34b inwardly adjacent the outer sides of housing 2, respectively, which extend laterally across the spools 4 and 6 and are connected to the passageway 12. The passageways 34a and 34b are connected to the passageways 30a and 30b, respectively, by means of spaced circular hydraulic passageways 36a and 36b, respectively, in which the portions of the spool 4 spaced outwardly from the portions 32a and 32b, respectively, are located to normally block the passageways 36a and 36b. It will also be noted that the passageway 10 is connected hydraulically to the passageways 24a and 24b by means of spaced circular hydraulic passageways 38a and 38b, respectively, in which the portions of the spool 4 adjacent the portion 20 are normally located to block the passageways 38a and 38b.

In operation it is desired that the movement of a spool 4 to either of its two operating positions will cause a passageway 10 to be blocked and a passageway 24a or 24b to be hydraulically connected to a passageway 30a or 30b through a passageway 28a or 28b. Simultaneously for the same spool 4 the other passageway 24a or 24b is blocked by a portion of the spool 4 and the other passageway 30a or 30b connected to the outlet port 16 by means of a hydraulic passageway comprising the passageways 36a or 36b, 34a or 34b, 12 and 14. As can be appreciated such requirements are dependent upon the spacing and width of the hydraulic passageways and the spacing and length of the reduced portions of the spool 4. It will be noted that in order to obtain definite positioning of the spool 4 in either of its two operating positions and its neutral position a suitable detent mechanism 40 is provided opposite the end of the spool 4 which is engaged for movement which may be of any suitable construction as is well known in the art. Further the enclosed end of the spools 4 and 6 may be exposed to atmospheric pressure in any suitable well-known manner so that the spool 4 is hydraulically balanced.

The construction of the portions of the housing 2 which are cooperable with the spool 6 and the spool 6 are substantially hydraulically identical to the portions of the housing 2 which are cooperable with the spool 4 and the spool 4; accordingly, like parts have been given the same reference numeral primed. It will be noted that the passageway 10 of the housing 2 adjacent the reduced portion 20' of the spool 6 is not provided with a seat 22 as previously indicated, but is enlarged to allow free flow of hydraulic fluid to the passageway 10 to place complete control of the circuit in spool 4. Simultaneously the reduced portions 32a' and 32b' have been enlarged longitudinally of the spool 6 for a purpose as more clearly described hereinafter. In order to provide a spring return of the spool 6 to its neutral position within the housing 2 a suitable double-acting biasing means 42 may be provided at either end of the spool 6 so as to urge the spool 6 towards the neutral position. Further, it will be noted that each passageway 10 adjacent the inlet ports 8a and 8b is provided with a relief valve 44 to prevent excess pressure from building up within the passageway 10 which may be of any suitable structure as is well known in the art. Although only a portion thereof is shown, it is to be realized that the passageways 24a' and 24b' in each half of the housing 2 are hydraulically connected to the passageways 26 in the same manner as the passageways 24a and 24b previously described.

In order, however, to obtain movement of a spool 6, the opposite ends of each spool 6 extend laterally outwardly of the passageways 34a and 34b, respectively, and the housing 2 is provided with suitable chambers 33a and 33b at the ends of the spools 6, respectively, which are provided with suitable inlet ports 35a and 35b, respectively. With such structure high pressure fluid entering the chambers 33a and 33b will cause a corresponding lateral movement of the spools 6 as more fully described hereinafter.

Referring to Figures 2 and 3, a selector valve of my invention comprises an elongated housing 50 which is formed as hereinafter described in any suitable manner from any suitable material such as cast iron. The housing 50 is provided with an elongated central bore in which an elongated spool 52 is located so as to be movable longitudinally of the housing 50 between two different operating positions. One end of the spool 52 extends outwardly of the housing 50 to be engageable in any suitable manner to obtain the desired movement thereof and the other end is hydraulically sealed and is provided with a suitable detent mechanism 54 to indicate the location of the spool 52 in either one of its operating positions. As shown, the housing 50 is provided with a plurality of uniformly longitudinally spaced hydraulic passageways which extend around the spool 52 and of which every third passageway 56 is connected to a suitable outlet port 58 in any suitable manner, such as by providing a longitudinally extending hydraulic passageway 59 in the housing 50 connected to each passageway 56 and to which the port 58 is hydraulically connected. The spool 52 is provided with a plurality of longitudinally spaced circumferentially reduced sections 60a, 60b, 60c and 60d, each of which is of a longitudinal length to extend between two adjacent hydraulic passageways about the spool 52. In the high speed position of the spool 52 as shown each reduced portion 60a, 60b, 60c and 60d extends between passageways 56 and hydraulic passageways 62a, 62b, 62c, 62d, respectively, longitudinally adjacent one side of passageways 56. The passageways 62a, 62b, 62c and 62d are provided at the outer portion of the housing 50 with suitable ports 64a, 64b, 64c and 64d, respectively, in order to facilitate making hydraulic connections thereto. Movement of the spool 52 outwardly of the housing 50 causes the reduced portions 60a, 60b, 60c and 60d of the spool 52 to extend between passageways 62a, 62b, 62c and 62d and hydraulic passageways 66a, 66b, 66c and 66d, respectively, longitudinally adjacent the side of passageway 56 opposite that upon which the passageways 62a, 62b, 62c and 62d are located, respectively. The passageways 66a, 66b, 66c and 66d are provided with suitable ports 67a, 67b, 67c and 67d, respectively, in order to make suitable hydraulic connections thereto. If desired an additional hydraulic passageway 68 may be located adjacent the controlled end of the spool 52 which is connected to the passageway 59 in order to provide a relief for the sealing means which are normally provided on the outer end of the reciprocating spool 52. Thus, it will be noted that the selector valve is of the push-pull type so that upon inward movement of the spool 52 the passageways 56 are hydraulically connected to the passageways 62a, 62b, 62c and 62d through the reduced portions 60a, 60b, 60c and 60d and the passageways 66a, 66b, 66c and 66d are blocked. Upon outward movement of the spool 52 the passageways 66a, 66b, 66c and 66d are hydraulically connected to the passageways 62a, 62b, 62c and 62d through the reduced portions 60a, 60b, 60c and 60d and the passageways 56 are blocked.

Figure 6 is a diagrammatic representation of a hydraulic circuit constructed in accordance with the principles of my invention in which the control and selector valve structures as heretofore described are employed. It will be noted that various parts previously described have been identified by the same reference numerals. In Figure 6 the reference numerals 131a, 131b, 131a' and 131b' have been employed for the reference numerals 31a, 31b, 31a' and 31b' on the right-hand side of the control valve in order to clarify the description of the hydraulic connections of my circuit. Inasmuch as the components other than the valves heretofore described do not, per se, constitute a part of my invention and are well known in the art a diagrammatic representation thereof is believed to be sufficient to fully illustrate and describe the novel circuit of my invention. Thus it will be noted that a pair of suitable hydraulic pumps P1 and P2 which have their low pressure side suitably connected to a suitable sump S, the pump P1 has a suitable hydraulic line 70a suitably connected to the inlet port 8a of the control valve as previously described. The pump P2 is similarly connected to the inlet port 8b by means of line 70b.

The ports of the control valve 31a, 31b, 131b, and 131a are connected by suitable hydraulic lines 71, 72, 73 and 74, respectively, to the ports 67a, 67b, 67c and 67d of the selector valve, respectively. Similarly the ports of the control valve 35a, 35b, 35a', and 35b' are connected by suitable hydraulic lines 75, 76, 77 and 78 respectively, to the ports 64a, 64b, 64c and 64d of the selector valve, respectively. The outlet port 16 is hydraulically connected by means of a suitable hydraulic line 79 to the sump S. Similarly the outlet port 58 of the selector valve is hydraulically connected by means of a suitable hydraulic line 80 to the sump line 79 or to the pump S, if desired.

As will become apparent, the control valves heretofore described when connected hydraulically as heretofore described are suitable for driving a pair of hydraulic motors, each of which comprises a pair of tandem driven members rigidly connected to a common power output shaft. Inasmuch as such tandem hydraulic motors are well known in the art the structure thereof has not been illustrated. For convenience in describing my invention each of the driven members of each of the hydraulic motors has been given a separate designation, M1, M2, M3 and M4, with the driven members M1 and M4 being connected to the same force output shaft S2 and the driven members M2 and M3 being connected to the same power output shaft S4. It is to be realized that each of the driven members is provided with a spaced hydraulic input and hydraulic discharge port which will vary in function depending upon the direction in which the hydraulic fluid is flowing therethrough. For convenience in describing my invention the designation P1, P1', P2, P2', P3, P3', and P4, P4' have been employed to identify the spaced ports of the driven sections M1, M2, M3 and M4, respectively. When employing a pair of such tandem hydraulic motors the ports 31a, 31b, 131a, 131b, 31a', 31b', 131a' and 131b' are hydraulically connected to the ports P1, P1', P2, P2', P4, P4', P3 and P3', respectively, by means of suitable hydraulic conductors 81, 82, 83, 84, 85, 86, 87 and 88, respectively.

As will become apparent herein one spool 4 and its companion spool 6 in conjunction with a portion of the selector valve is employed to control the power output of the driven members M1 and M4 while the other spool 4 and its companion spool 6 in conjunction with the remaining portion of the selector valve is employed for controlling the driven members M2 and M3. Inasmuch as the control for the driven members M1 and M4 is identical to that for the driven members M2 and M3 only one half of the operating circuit of my invention will be described; however, it is to be realized that exactly the same control will occur for the driven members not specifically described. Thus, referring to all figures and assuming that the control and selector valves are in the position as shown, it will be noted that when the pump P1 is operating hydraulic fluid under pressure will flow through the line 70a, through the inlet port 8a of the left side of Figure 1 into the passageway 10, around the central reduced portion 20' of the spool 6, around the central reduced portion 20 of the spool 4 to the chamber 12, through the passageway 14, outlet 16 and line 79 to the sump S. As both spools 4 and 6 are in the neutral position the passageways 24a, 24b, 24a' and 24b' are blocked by the enlarged portions of the spools 4 and 6 adjacent the reduced portions 20 and 20', respectively.

Upon movement of the left spool 4 in Figure 1 upward the section of the spool 4 between the reduced sections 20 and 32b will engage the seat 22 whereby the aforedescribed flow of fluid past the seat 22 will be stopped. Such movement of the spool 4 opens the passageway 24b so that hydraulic fluid will flow through the passageway 26 and through the passageway 24b. It will be noted, however, that such upward movement of the left spool 4 causes the port 30a to be connected to the passageway 34a through the passageway 36a by means of the reduced section 32a extending through the passageway 36a. At the same time the portion of the left spool 4 between the reduced sections 32a and 20 continues to block the passageway 24a so that no hydraulic fluid can flow therethrough. Simultaneously the upward movement of the left spool 4 connects the pressure passageway 24b to the passageway 30b due to the location of the reduced portion 32b in the passageway 28b. Due to this connection, hydraulic fluid under pressure flows outwardly of the port 31b through line 72 to the port 67b of the selector valve. With the spool 52 of the selector valve shown in its inward position the passageway 66b, which is hydraulically connected to the port 67b is blocked by the portion of the spool 52 between the reduced portions 60a and 60b. Accordingly, no high pressure fluid will flow through the selector valve. Inasmuch as the line 82 is also connected to the port 31b hydraulic fluid under pressure will flow through line 82 to the first driven member M1 by entering the port P1' and exiting through the port P1, and then flow through the line 81 which is connected to the port 31a and the passageway 30a which as previously indicated is connected to the sump S. Accordingly, the motor member M1 will be driven in one given direction due to such flow of hydraulic fluid therethrough. By following the same procedure it will be noted that the motor member M2 connected across the ports 131a and 131b will be driven in the same direction as the motor member M1 upon upward movement of the right spool 4.

As indicated the left spool 6 is in the neutral position so that each of the passageways 24a' and 24b' is blocked. In view of the fact that the passageway 66b, as indicated, is also blocked, no hydraulic fluid under pressure can flow to the hydraulic line 76 so that no hydraulic pressure can be applied to the lower end of the right spool 6 to cause upward movement thereof. As the port 35a of the left spool 6 is connected to the sump S through line 75, passageways 62a and 56 of the selector valve which are hydraulically connected by the reduced portion 60a of the spool 52 and line 80 no hydraulic fluid under pressure can be applied to the upper end of the left spool 6 to cause downward movement thereof. Accordingly, the spool 6 floats in its neutral position when the spool 4 only is moved inwardly or outwardly of the housing 2. Inasmuch as the driven members M1 and M4 are connected to the same shaft S2 and as hydraulic fluid is normally in the lines 85 and 86, it is to be realized that rotational movement of the driven member M1 will cause the member M4 to also rotate so that hydraulic fluid will be displaced in the lines 85 and 86. Accordingly, it will be noted that each of the reduced sections 32a' via 31a' and 32b' via 31b' of the spool 6 to which lines 85 and 86 are hydraulically connected, respectively, are elongated with respect to the portions 32a and 32b of the spool 4 previously described so that the passageways 30a' and 30b' are normally connected to the passageways 34a and 34b, respectively, which, as previously indicated, are connected to the sump S. Accordingly, regardless in which direction the fluid may be moving through the lines 85 to 86 no appreciable hydraulic pressure can be built up therein with the spool 4 in either of its operating positions. By following the same procedure it will be noted that downward movement of the left spool 4 will clearly produce the same floating effect on the left spool 6, however, the direction of rotation of the driven member M1 is reversed.

Assuming that the left spool 4 is again pushed upwardly, it will be obvious that the heretofore described conditions will again prevail with regard to the driving of the driven member M1. Upon outward movement of the spool 52 of the selector valve the portion of the spool 52 between the reduced portions 60a and 60b moves outwardly to hydraulically connect the passageway 66b to the passageway 62b so that hydraulic fluid under pressure flows through line 72 to line 76, through port 35b and enters the chamber 33b at the lower end of the left spool 6. Such fluid under pressure will cause upward movement of the left spool 6 so that the passageway 24b' is hydraulically connected to the passageway 30b' due to the reduced portion 32b' of spool 6 extending therebetween. At the same time the portion of the left spool 6 between the reduced portion 32b' and its lower end enters the passageway 36b' so that hydraulic fluid under pressure cannot flow from the passageway 24b' to the sump S through passageway 34b. Simultaneously, the upward movement of the left spool 6 keeps the passageway 24a' blocked by the portion of the spool 6 between reduced portion 20' and 32a' and the passageway 30a' remains hydraulically connected to the sump S.

Under these circumstances high pressure fluid will continue to flow to the driven member M1, as previously indicated, and in addition, hydraulic fluid under pressure will flow through passageways 24b', 28b' and 30b', through port 31b', line 86, port P4', driven member M4, port P4, line 85, to the port 31a', which as indicated remains connected to the sump S. Thus both driven members M1 and M4 are caused to be driven in the same direction by hydraulic fluid under pressure flowing therethrough. Since both driven members M1 and M4 are driven and are connected to the same shaft S2 the revolutions per minute of the shaft S2 are decreased as compared to the previously described situation where only the driven member M1 is driven. By following the same procedure it can readily be seen that upon downward movement of the left spool 4 and outward positioning of the spool 52 the line 71 is hydraulically connected to the line 75 to force the spool 6 downwardly whereby hydraulic fluid under pressure flows in exactly the reverse direction through the driven member M4 so that the direction of both driven members M1 and M4 is reversed. It should be noted that with the selector valve in the outward position the lines 75, 76, 77 and 78 are disconnected from the sump S and are connected to lines 71, 72, 73 and 74, respectively. In the instance described where fluid flows from line 72 to line 76 it will be noted that line 71 is hydraulically connected through port 31a to the passageway 30a which, as indicated, is connected to the sump S. Accordingly, no hydraulic fluid under pressure can exist in the chamber 33a when it exists in the chamber 33b. The reverse operation of such connection is clearly apparent.

Thus it will be noted that I have provided a simple control circuit and valves therefor which permit two speed driving of hydraulic motors in either one of two directions. It will be obvious that the power output of the motors may be employed in various well-known manners to drive separate endless tread devices. Further, it will be noted that due to the numerous sump connections the direction or speed of rotation may be quickly changed without causing damage to any components. Of particular note is the fact that the operation of the manual spools completely controls the totally enclosed spools so that the enclosed spools are locked in their desired position by the manually operable spools. It will be noted that the housing 2 as shown but not described may be formed from a plurality of members as is well known in the art in order to facilitate the construction thereof. Also various packing and relief means have been provided to obtain the desired structure and protection therefor. If desired, suitable relief valves (not shown) may be connected across the driven members M1, M2, M3 and M4 to prevent their doing damage when operating as a pump as is well known in the art.

Having described a preferred embodiment of my invention in accordance with the patent statutes, it is to be realized that modifications thereof may be made without departing from the broad spirit of my invention. Accordingly, it is respectfully requested that my invention be interpreted as broadly as possible and as limited only by the prior art.

What I claim is:

1. A control valve comprising, a housing, first and second members movably supported by said housing, passageways in said housing cooperable with said first and second members, respectively, said first and second members having a neutral position whereat one of said passageways is blocked, said first member being movable from said neutral position to connect said passageway cooperable therewith to another passageway in said housing which other passageway is connected to a driven member, said other passageway also being connected to another passageway in said housing cooperable with said second member for causing movement of said second member from said neutral position, and another one of said first mentioned passageways cooperable with said second member being connected to still another passageway in said housing which is cooperable with said second member and is connected to another driven member upon movement of said second member from said neutral position said other driven member is operatively connected to said first mentioned driven member which members are connected to a common output means.

2. A control valve comprising, a housing, first and second elongated members movably supported by said housing for longitudinal movement therein, each of said first and second members and the portions of the housing cooperable therewith being identical on each side of the lateral center thereof, said identical portions comprising, passageways in said housing cooperable with said first and second members, respectively, said first and second members having a neutral position whereat said passageways are blocked, said first member being movable from said neutral position to connect the passageway cooperable therewith to another passageway in said housing which is adapted to be connected to a driven member and thereby drive said member at a first speed, said other passageway also being adapted to be connected to another passageway in said housing cooperable with said second member for causing movement of said second member from said neutral position, another one of said first mentioned passageways cooperable with said second member being connected to still another passageway in said housing which is cooperable with said second member and is adapted to be connected to another driven member upon movement of said second member from said neutral position, and said driven members being connected to a common output means which is thereby driven at a speed lower than said first mentioned speed.

3. A control circuit comprising, a housing having a plurality of passageways therein, a first movable member supported within said housing in a neutral position, said first member being selectably movable from said neutral position to connect a first of said passageways to a second of said passageways which is adapted to be connected to a driven member, a second member movably supported by said housing, a selector valve having a third member movable therein between two operating positions, means for connecting said second passageway to said selector valve and said selector valve to a third of said passageways in said housing which is located with respect to said second member to cause movement thereof when traversed by an operating medium, another of said first mentioned passageways being connected to a fourth passageway which is connected to another driven member upon said movement of said second member, and said selector valve being movable to one position to so connect said second passageway to said third passageway and movable to another position to prevent connecting said second passageway to said third passageway.

4. A control valve comprising, a housing, first and second elongated spool members movably supported for longitudinal movement within said housing, a plurality of inlet passageways in said housing cooperable with said first and second spool members, respectively, said first and second spool members having a neutral position whereat said inlet passageways are blocked, said first member being movable to locate integral means to connect one of said inlet passageways cooperable therewith to another passageway in said housing which is adapted to be connected to a driven member, said other passageway being adapted to be connected to another passageway in said housing cooperable with said second spool member for causing movement of said second spool member from said neutral position, and said second spool member having integral means located upon such movement from said neutral position to connect one of said inlet passageways cooperable therewith to still another passageway in said housing which is cooperable with said second spool member and is adapted to be connected to another driven member.

5. A control circuit for a pair of driven elements which are connected to a single driven shaft comprising, a housing having inlets connected to first and second members, respectively, said first and second members being movable and having a neutral position whereat said inlets are blocked, said housing having a normally open exit passageway and a pair of outlets connected to said first and second members, respectively, spaced from said inlets, respectively, said exit passageway conducting pressurized fluid therethrough when said members are in neutral position, said exit passageway being blocked by said first movable member when either or both movable members are displaced from neutral position, said outlet cooperable with said first member being connected to a selector valve which is connected to an auxiliary inlet passageway in said housing at one end of said second member, said first member having integral means whereby said inlet cooperable therewith is connected to said outlet cooperable therewith upon movement thereof, said selector valve having movable means for connecting said outlet cooperable with said first member to said auxiliary inlet passageway when located in one position whereby movement of said second member occurs, said second member having integral means whereby said inlet cooperable therewith is connected to said outlet cooperable therewith upon such movement of said second member, said movable means of said selector valve being movable to another position whereby said auxiliary inlet passageway is blocked to prevent movement of said second member, and each of said outlets being adapted to be connected to one of said driven elements.

6. A hydraulic control circuit comprising, a housing having a plurality of passageways therein, a first movable member slidably supported in said housing and being selectably movable in one direction from said neutral position to connect a first of said passageways to a second of said passageways which is adapted to be connected to a driven member, a second member reciprocably supported by said housing, a selector valve having a third member movable therein between two operating positions, means for connecting said second passageway to said selector valve and said selector valve to a third of said passageways which is located with respect to said second member to cause movement thereof in one direction when traversed by an operating medium, another of said passageways being connectable to a fourth passageway which is connected to another driven member upon movement of said second member in said one direction, said selector valve having integral means movable to one position to connect said second passageway to said third passageway and movable to another position to prevent connecting said second passageway to said third passageway, said housing and said first and second members being hydraulically identical when said first and second members are moved in a direction opposite of said one directions, and said selector valve having another hydraulically identical section for controlling the other hydraulic portions of said housing and said first and second members.

7. A hydraulic control circuit comprising, a housing having a plurality of passageways therein, a first member supported by said housing having means for causing reciprocable movement therein from a neutral position, said first member being selectably movable in one direction from said neutral position to connect a first of said passageways to a second of said passageways which is adapted to be connected to a driven member, a second member reciprocably supported by said housing, means for connecting said second passageway to said selector valve and a third of said passageways which is located with respect to said second member to cause movement thereof in one direction when traversed by an operating medium, another of said plural passageways being connectable to a fourth passageway which is adapted to be connected to another driven member upon movement of said second member in said one direction, said driven members being connected to a common output means, said means having integral means movable to one position to so connect said second passageway to said third passageway and movable to another position to prevent connecting said second passageway to said third passageway, said housing and said first and second members being hydraulically identical when said first and second members are moved in a direction opposite of said one directions, and said selector valve having another hydraulically identical section for controlling the other hydraulic portions, of said housing and said first and second members, and said entire aforesaid hydraulic sections being duplicated to control a plurality of driven members, which have a common output means.

8. A control valve comprising, a housing, first and second members movably supported by said housing, means associated with said first and second members to obtain movement of said second member only in response to movement of said first member, a normally open passageway in said housing connected to said first member, said first member having means for closing said passageway upon said movement thereof, said passageway having a portion surrounding a portion of said second member, and said surrounding portion of said passageway being larger than said portion of said second member to prevent said second member upon said movement thereof from closing said passageway at any time.

9. A control valve comprising, a housing, first and second members movably supported by said housing, means associated with said first and second members to obtain movement of said second member in opposite directions from a neutral position only in response to movement of said first member, a normally open passageway in said housing connected to said first member, said first member having means for closing said passageway upon said movement thereof, said passageway having a portion surrounding a central portion of said second member, and said surrounding portion of said passageway being enlarged to prevent said second member from closing said passageway at any time.

10. A control valve comprising, a housing, first and second elongated spool members movably supported for longitudinal movement within said housing, inlet passageways in said housing cooperable with said first and second spool members, respectively, said first and second spool members having a neutral position whereat said inlet passageways are blocked, said inlet passageways having exit means cooperable with said spool members to permit pressurized fluid to flow therethrough unobstructed by said second member regardless of said second members position, said exit means being blocked by said first member when moved from said neutral position, said first member being movable to locate integral means to connect the inlet passageway cooperable therewith to another passageway in said housing which is adapted to be connected to a driven member, said other passageway being adapted to be connected to another passageway in said housing cooperable with said second spool member for causing movement of said second spool member from said neutral position, said second spool member having integral means located upon such movement from said neutral position to connect said inlet passageway cooperable therewith to still another passageway in said housing which is cooperable with said second spool member and is connected to another driven member, a return inlet adapted to be connected to a driven member which is cooperable with said first member, and said first member having means for connecting said return inlet to said exit passageway upon said first mentioned movement.

11. A control valve comprising, a housing, first and second elongated spool members movably supported for longitudinal movement within said housing, inlet passageways in said housing cooperable with said first and second spool members, respectively, said first and second spool members having a neutral position whereat said inlet passageways are blocked, said first member being movable to locate integral means to connect the inlet passageway cooperable therewith to another passageway in said housing which is adapted to be connected to a driven member, said other passageway being adapted to be connected to another passageway in said housing cooperable with said second spool member for causing movement of said second spool member from said neutral position, said second spool member having integral means located upon such movement from said neutral position to connect said inlet passageway cooperable therewith to still another passageway in said housing which is cooperable with said second spool member and is adapted to be connected to another driven member, a return inlet adapted to be connected to a driven member which is cooperable with said first member, said first member having means for connecting said return inlet to an exit passageway upon said first mentioned movement, another return inlet adapted to be connected said other driven member which is cooperable with said second member, and said second member having means for connecting said other return inlet to another exit passageway upon said such movement of said second member.

12. A control valve comprising, a housing, first and second elongated spool members movably supported for longitudinal movement within said housing, inlet passageways in said housing cooperable with said first and second spool members, respectively, said first and second spool members having a neutral position whereat said inlet passageways are blocked, said first member being movable to locate integral means to connect the inlet passageway cooperable therewith to another passageway in said housing which is adapted to be connected to a driven member, said other passageway being adapted to be connected to another passageway in said housing cooperable with said second spool member for causing movement of said second spool member from said neutral position, said second spool member having integral means located upon such movement from said neutral position to connect said inlet passageway cooperable therewith to still another passageway in said housing which is cooperable with said second spool member and is adapted to be connected to another driven member, a return inlet adapted to be connected to a driven member which is cooperable with said first member, said first member having means for connecting said return inlet to an exit passageway upon said first mentioned movement, another return inlet adapted to be connected said other driven member which is cooperable with said second member said second member having means for connecting said other return inlet to another exit passageway upon said such movement of said second member and said aforementioned structure being duplicated on each of said spool members and said housing.

13. A hydraulic control circuit comprising, a housing having a pair of bores therethrough, an inlet passageway intersecting said bores, a first and second member slidably disposed in said bores and normally connecting said inlet passageway to an exit passageway, said inlet passageway adjacent said second member surrounding said second slidable member and being of enlarged diameter to provide continous passage of fluid medium therethrough regardless of the position of said second member, said housing having a pair of spaced inlet ports connected to said bores blocked by said slidable members when placed in their normal neutral position, said inlet passageway being connected to said inlet ports, biased valve means blocking the connection between said inlet passageway and inlet ports, said housing having a pair of outlet means connected to said respective bores, said outlet means spaced adjacent said inlet ports, one of said outlet ports associated with and cooperable with said first member when said first member is moved from said normal position to connect the inlet port to a first driven member and to condition said second movable member to connect one of said inlet ports associated with said second member to a second driven member.

References Cited in the file of this patent

UNITED STATES PATENTS

| | | |
|---|---|---|
| 2,445,781 | Hrdlicka | July 27, 1948 |
| 2,475,298 | Sloane | July 5, 1949 |
| 2,501,328 | Gurries | Mar. 21, 1950 |
| 2,586,932 | Gardiner et al. | Feb. 26, 1952 |
| 2,690,192 | Dannhardt | Sept. 28, 1954 |
| 2,718,240 | Margrave | Sept. 20, 1955 |
| 2,772,694 | Simmons | Dec. 4, 1956 |
| 2,812,775 | Hodgson | Nov. 12, 1957 |

UNITED STATES PATENT OFFICE
Certificate of Correction

Patent No. 2,964,022

December 13, 1960

Carlton B. Frellsen

It is hereby certified that error appears in the above numbered patent requiring correction and that the said Letters Patent should read as corrected below.

Column 2, line 31, for "a suitable" read —the—; column 5, line 7, for "P1 and P2" read —HP1 and HP2—; line 9, for "P1" read —HP1—; line 11, for "P2" read —HP2—; line 28, for "driving" read —controlling—; line 67, for "P1" read —HP1—; column 6, line 71, for "to" read —and—; column 8, lines 21 and 22, for "other", each occurrence, read —another—; column 8, line 31, for "said other" read —, said another—; same column 8, line 47 and column 9, line 16, for "other", each occurrence, read —another—; column 9, line 38, for "either" read —one—; column 10, line 30, before "means", first occurrence, insert —first mentioned—; lines 37 to 42, strike out "and said selector valve having another hydraulically identical section for controlling the other hydraulic portions, of said housing and said first and second members, and said entire aforesaid hydraulic sections being duplicated to control a plurality of driven members, which have a common output means." and insert instead —said first and second members being duplicated to control a plurality of other driven members which have a common output means, and said first mentioned means having another integral means identical with said first mentioned integral means for controlling said duplicated members. —; column 11, line 9, for "other" read —another—; lines 18 and 19, for "return inlet" read —return-inlet—; line 19, for "a" read —the—; line 21, for "return inlet" read —return-inlet—; line 33, for "other" read —another—; line 42, for "return inlet" read —return-inlet—; line 43, for "a" read —the—; lines 45 and 46, for "return inlet", each occurrence, read —return-inlet—; line 47, for "said other" read —to said another—; line 49, for "other return inlet" read —another return-inlet—; column 12, line 3, for "other" read —another—; line 12, for "return inlet" read —return-inlet—; line 13, for "a" read —the—; lines 15 and 16, for "return inlet" read —return-inlet—; line 17, for "said other" read— to said another—; line 19, for "other return inlet" read —another return-inlet—; line 30, strike out "of"; same line 30, strike out "diameter"; line 44, for "condition" read —position—.

Signed and sealed this 6th day of February 1962.

[SEAL]

ERNEST W. SWIDER,
*Attesting Officer.*

DAVID L. LADD,
*Commissioner of Patents.*